United States Patent [19]
Dahlgren et al.

[11] 3,744,392
[45] July 10, 1973

[54] FOCAL PLANE SHUTTER GAP SETTING MECHANISM

[75] Inventors: Lennart Gunnar Oskar Dahlgren, Vastra Frolunda; Alf Ingvar Alfredsson, Savedalen, both of Sweden

[73] Assignee: Fritz Victor Hasselblad, Goteborg, Sweden

[22] Filed: Dec. 8, 1970

[21] Appl. No.: 96,080

[30] Foreign Application Priority Data
May 6, 1970 Sweden............................. 6235/70

[52] U.S. Cl. ................................................. 95/57
[51] Int. Cl. ............................................ G03b 9/34
[58] Field of Search ................................. 95/57, 55

[56] References Cited
UNITED STATES PATENTS

| | | | |
|---|---|---|---|
| 2,512,815 | 6/1950 | Swensson | 95/57 |
| 3,515,049 | 6/1970 | Knapp | 95/57 |
| 2,192,500 | 3/1940 | Leitz, Jr. | 95/57 |
| 3,138,083 | 6/1964 | Thomas et al. | 95/57 |
| 2,671,390 | 3/1954 | Smith | 95/57 X |
| 3,109,357 | 11/1963 | D'Oplrinter | 95/57 X |
| 3,468,236 | 9/1969 | Rentschler et al. | 95/57 |
| 3,554,106 | 1/1971 | Baumgarten | 95/75 |

Primary Examiner—Samuel S. Matthews
Assistant Examiner—Michael L. Gellner
Attorney—Sommers & Young

[57] ABSTRACT

An improved shutter assembly for a photographic camera with a focal plane shutter, such as a curtain-type or one with two plane disks separated by an adjustable gap, in which an opening means and a closing means are separated by an adjustable gap, means for cocking, locking and releasing the shutter are operatively connected with means for forming a preset gap and means for opening and closing the opening and closing means, respectively, are operatively connected to the opening and closing means. The preset gap width corresponds to the fastest shutter speed and at slower speeds an electromechanical or electronic delay means forms a larger gap.

13 Claims, 8 Drawing Figures

FOCAL PLANE SHUTTER GAP SETTING MECHANISM

BACKGROUND OF THE INVENTION

This invention relates to photographic cameras having a focal plane shutter, the shutter comprising a first, opening part and a second, closing part, which parts are separated by an adjustable gap, and it refers to an arrangement for cocking, locking and releasing the shutter in combination with a means for forming a preset gap, the width of which corresponds to the fastest shutter speed. The invention refers primarily to focal plane shutters of the curtain type, but it can also be applied to focal plane shutters comprising two plane disks separated by an adjustable gap. By releasing the opening and closing parts simultaneously without using any delay means to form the gap, the exposure at the fastest shutter speed takes place with a precision higher than in conventional types of focal plane shutters. For other shutter speeds, i.e., slower than the fastest time, a gap-forming delay means of known electromechanical or electronic type is provided.

The focal plane shutter described in the following is of the curtain type as being the primary subject matter of the invention, but the disclosure also applies to focal plane shutters of the type comprising two disks separated by an adjustable gap.

In conventional curtain-type shutter constructions the two curtain parts, in the cocked and released state of the shutter, are so located that the free edges of the curtain parts facing each other overlap each other and thereby prevent the light-sensitive material from being exposed to light.

At the time of exposure the first curtain part starts moving immediately, and the second part starts moving after a certain delay in time corresponding to the amount of overlap plus that gap width between the free edges of the curtain parts which corresponds to the set shutter speeds. Heretofore, the delayed release of the second curtain part was effected in a mechanical way, i.e., the first curtain part, subsequent to its travel through the determined distance, released a catch holding the second curtain part. As a result, the first curtain part was braked temporarily in its travel. It was tried by different measures to compensate for the disturbance in the curtain travel caused by such braking as well as for the acceleration of the curtain gap past the focal plane and for other mechanical sources of errors, but there still remained a substantial residual error.

Curtain-type shutter constructions of a later date use magnetic release of the two curtain parts in combination with an electronic time delay circuit, and show apparent improvements. The electromagnetic release does not take energy from the second curtain part, which thereby travels undisturbed. The electronic components in the time delay circuit are of a great stability and long life. However, even if the release and time delay mechanism of the curtain-type shutter is of outmost quality, there still remains a residue error with respect to the curtain gap formation. In high-quality curtain-type shutters the absolute value of this error is relatively small, but its relative value increases with the choice of higher shutter speeds. At a shutter speed of about one one-thousandth of a second it has, therefore, been difficult to manufacture at reasonable costs a curtain-type shutter in which the real shutter speed could be held at limits closer than about ± 30 percent of the set shutter speed. Considering shutter speeds of about one two-thousandths of a second or still faster, as are required to-day, it is still more difficult to attain with curtain-type shutters of the afore-described kind a sufficient precision at the fastest exposure time of the shutter.

In most of the camera models on the market, the limited space available in the camera interior for the necessary control means is already fully utilized. If the camera is given greater dimensions to meet higher requirements of automatic operation, precision and reliability, the camera becomes heavy, clumsy and difficult to handle. It is, therefore, important to achieve the desired advantages within the available space by better and more compact constructions.

SUMMARY OF THE INVENTION

The arrangement of the present invention comprises a mechanism which satisfies the requirements of high precision in general, and precision at the fastest shutter speed of the shutter in particular, as well as good reliability and small space demand. The arrangement comprises a mechanism for cocking, locking and releasing the shutter which is assembled together and partially integral with a mechanism adapted, in the cocked position of the shutter, to form a preset gap between the free edges of the curtain parts of the shutter, the width of said gap corresponding to the fastest shutter speed. Due to the fact that the gap-forming mechanism provides the preset curtain gap, exposure is possible with the fastest shutter speed of the curtain-type shutter by releasing the locks for both curtain parts simultaneously without having to utilize any gap-forming time delay means for releasing the second curtain part. As a result, the source of error implied, as explained above, in the time delay is avoided, particularly at the fastest shutter speed of the curtain-type shutter. The gap-forming mechanism becomes operative first in the final cocking phase of the curtain-type shutter and thereby allows the curtain parts to move past the film gate with the free edges of the curtains in a light-tight overlapping relationship, thereby protecting the light-sensitive material. The gap is formed by means of a simple cam mechanism coacting with the locking mechanisms for the first and second curtain parts. The gap-forming mechanism and the locking mechanisms are so designed that the preset gap is given a high dimensional precision. For maintaining this precision upon exposure at the fastest shutter speed, the two curtain parts must be released simultaneously. The locking mechanisms, therefore, are designed so as in this special case to be positively controlled relative each other. For the other shutter speeds, i.e., slower than the highest shutter speed, the width of the preset gap must be increased by a distance corresponding to the selected shutter speed. This increase in width is effected by a suitable mechanical or electronic time delay mechanism, which is no part of this invention, and which releases the second curtain part after a corresponding period.

BRIEF DESCRIPTION OF THE DRAWINGS

In the following a preferred embodiment of the invention is described in greater detail, with reference to the accompanying drawings wherein.

DESCRIPTION OF THE PREFERRED EMBODIMENTS

Figure 1:
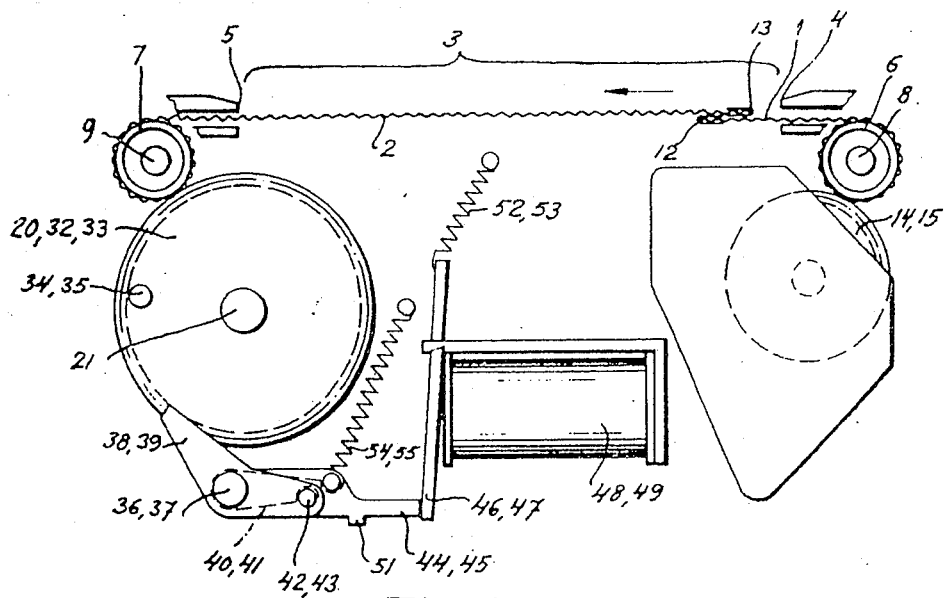
FIG. 1 shows a schematic view of a curtain-type shutter during its cocking seen straight from above.

As explained above, FIGS. 1, 3, 5 and 7 show the curtain-type shutter during its cocking, and FIGS. 2, 4, 6 and 8 subsequent to completion of its completed cocking. The reference numerals are identical in all Figures.

Figure 2:
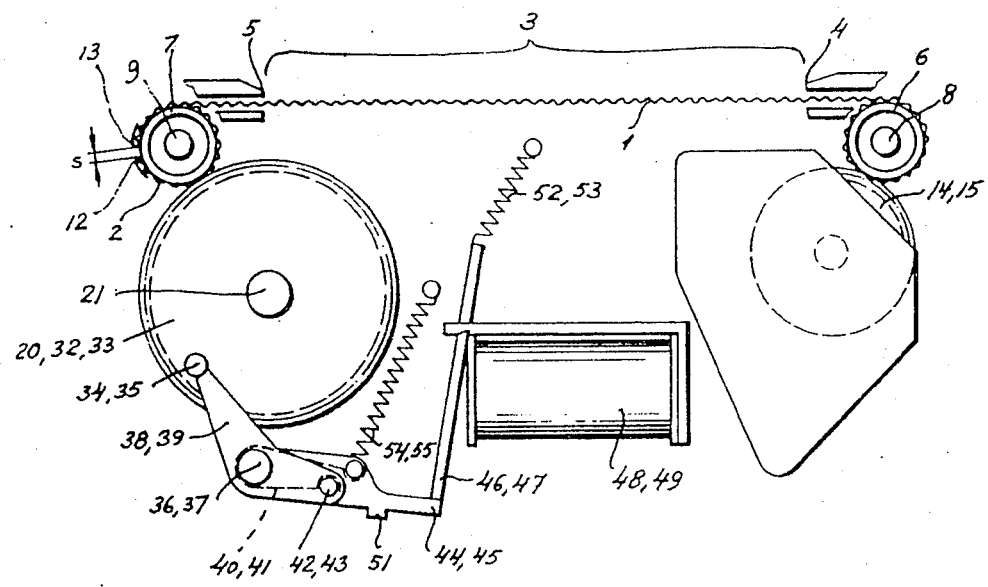
FIG. 2 illustrates the curtain-type shutter of FIG. 1 in its fully cocked position.

In the schematic views of FIGS. 1 and 2 the curtain-type shutter is mounted at the top and bottom of the camera body (not shown) in such a manner, that the curtain moves laterally in relation to the camera body.

Figure 3:
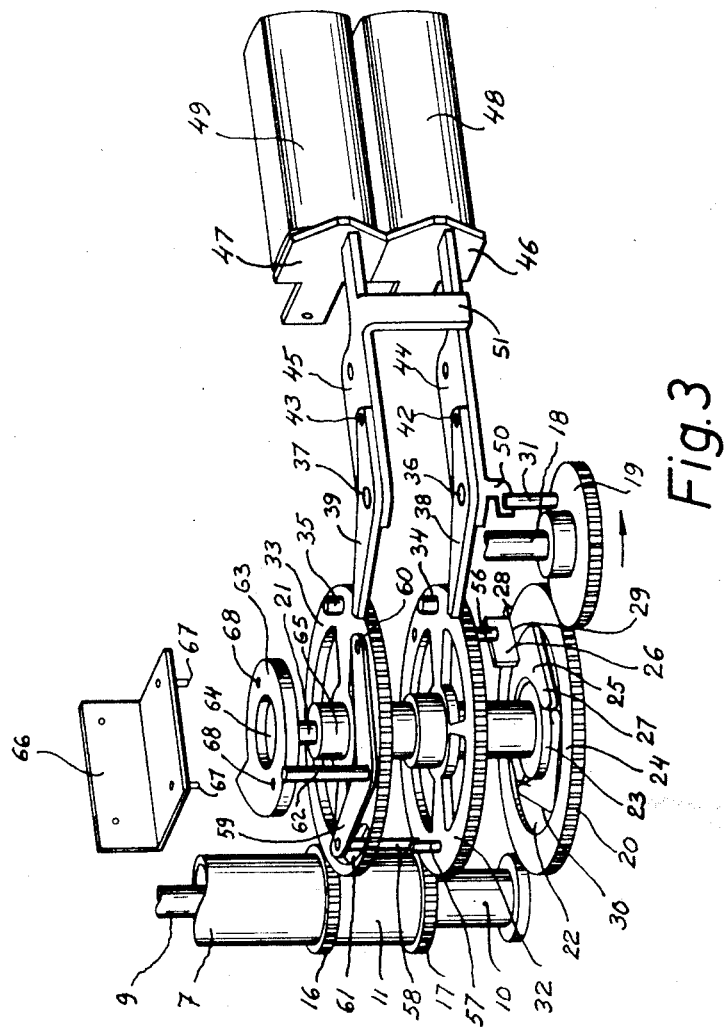
FIG. 3 shows in a perspective view, obliquely from above and somewhat pulled apart the cocking and gap-forming mechanism and coacting shutter parts during the cocking operation of the shutter.
Figure 4:
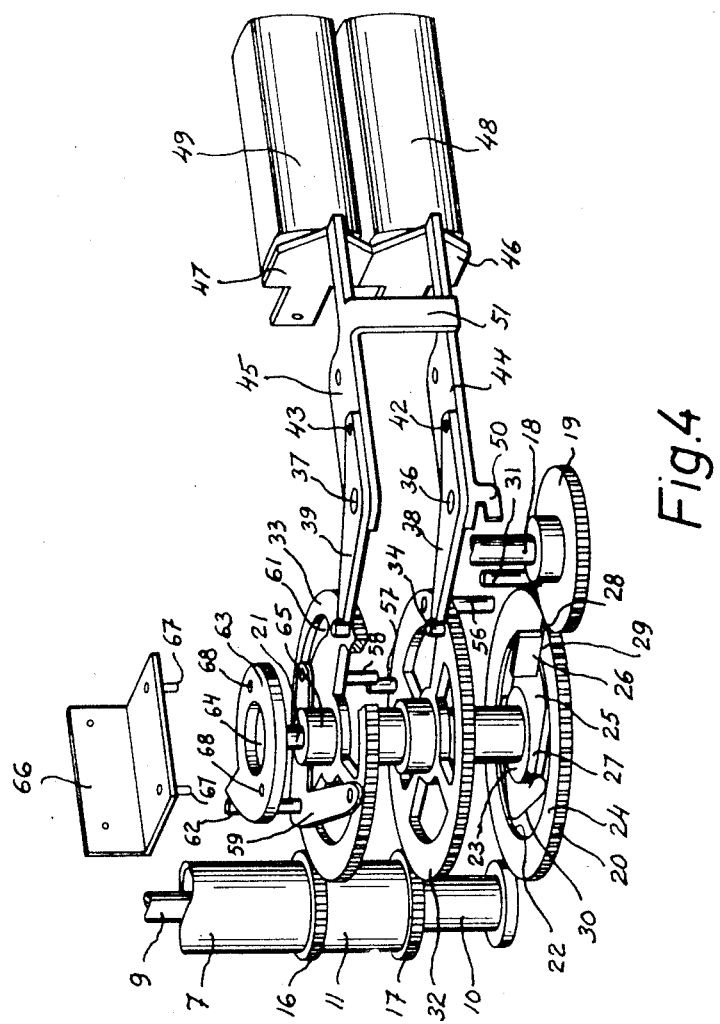
FIG. 4 shows the arrangement of FIG. 3 subsequent to completion of the cocking and gap formation operation, certain portions being cut away.

The curtain comprises a first and a second curtain part 1 and 2, respectively, and runs immediately in front of the film gate 3 in the rear wall of the camera body. The film gate 3 is defined on its sides by the right-hand and left-hand side edge 4 and 5, respectively. The curtain parts 1, 2 are wound on and off outer curtain axles 6, 7 which are supported on inner curtain axles 8 and 9, respectively, which as shown in FIGS. 3 and 4 run in bearings 10 mounted in the camera body. Each of the inner curtain axles 8, 9 is provided with a pair of stationary drums 11 between the outer curtain axles 6 and 7, respectively, and the bearings 10. On said drums 11 are wound on and off the cords or belts (not shown) which are fastened on said drums which serve as traction means for the curtain parts 1, 2, in such a way, that the drum pair 11 on the inner curtain axle 9 pulls by its traction means the first curtain part 1 outermost at its free edge 12, and the drum pair 11 on the inner curtain axle 8 in a corresponding way pulls the second curtain part 2 at its free edge 13. The righthand concentric axle pair 6, 8 in FIGS. 1 and 2 are each provided with a fixed gear ring (not shown), which engage and coact with spring-motors 14 and 15, respectively, to drive the curtain mechanism from left to right, at the time the shutter is released, by applying to the curtain parts 1, 2 a tractive force from the left to the right. The left-hand concentric axle pair 7, 9 in FIGS. 1–4 are provided in a corresponding way with fixed gear rings 16 and 17, respectively, coactingly engaging with the combined mechanism used for cocking the curtain-type shutter and for forming the preset curtain gap s (FIG. 2) corresponding to the fastest shutter speed.

Said combined mechanism comprises a driving part, a cocking and releasing part, and a gap-forming part.

The driving part (FIGS. 3, 5 and 4, 6, respectively) of said mechanism is connected to a crank (not shown) on the camera, used for transporting the film and cocking the shutter. The rotary movement of the crank is transferred by a drive shaft 18 mounted with its lower end in the bottom of the camera body. Said shaft 18 carries a fixed pinion 19 meshing with a toothed driven wheel 20. Said pinion 19 and wheel 20 are provided with carrier means, which will be described below, and which always must occupy the same positions when the shutter is being cocked. The wheel 20, therefore, always rotates one full revolution, and the gear ratio is so chosen that the pinion 19 rotates an integer number of revolutions, in the present embodiment two revolutions, for a single revolution of wheel 20. The wheel 20 is supported lowermost on a shaft 21 mounted in the bottom of the camera body.

Figure 5:
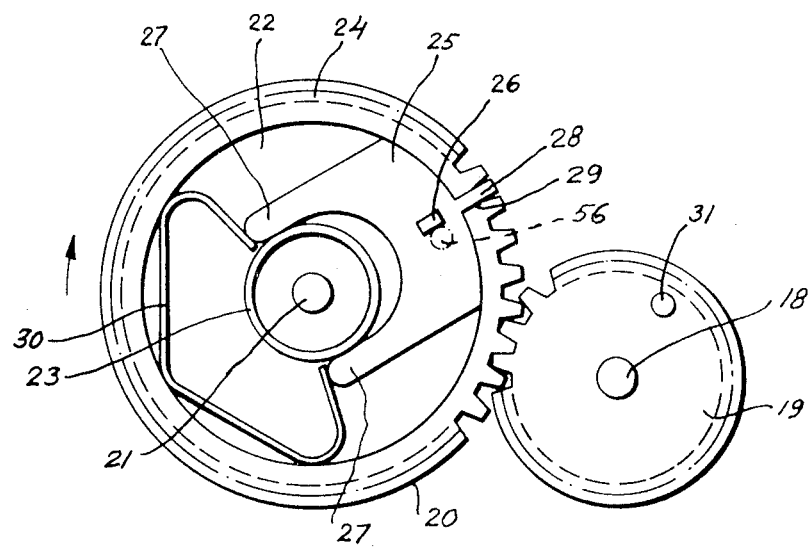
FIG. 5 shows on an enlarged scale a detail view of the lowermost wheels in FIG. 3, seen from above.
Figure 6:
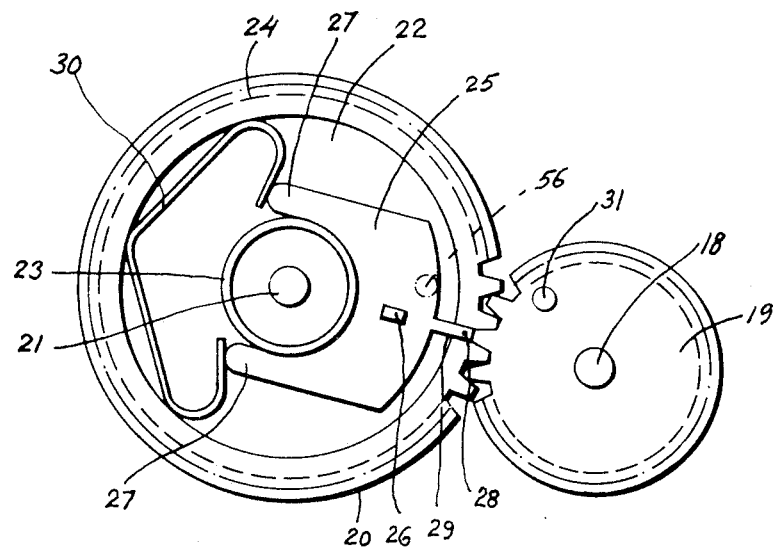
FIG. 6 shows on an enlarged scale a detail view of the lowermost wheels in FIG. 4, seen from above.
Figure 7:
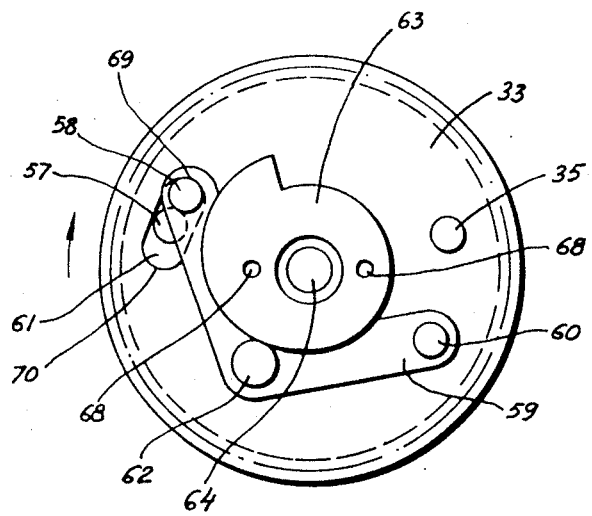
FIG. 7 shows on an enlarged scale a detail view of the gap-forming mechanism in FIG. 3, seen from above.
Figure 8:
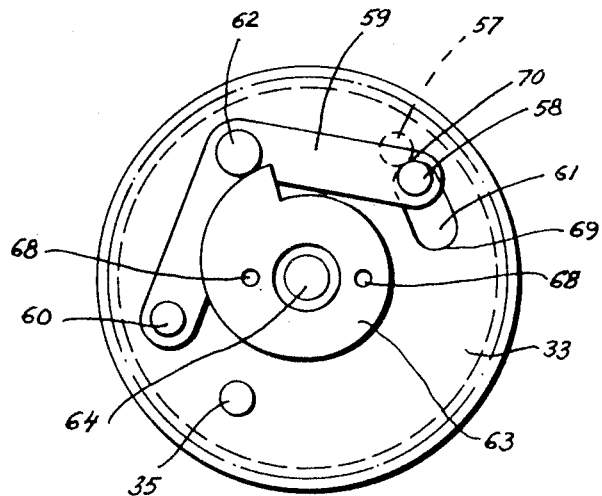
FIG. 8 shows on an enlarged scale a detail view of the gap-forming mechanism in FIG. 4, seen from above.

For disengaging the driving part from the remaining mechanism subsequent to the completed cocking of the shutter, the wheel 20 is provided with a movable controlled carrier mechanism shown in FIGS. 5, 6. In a recess 22 in the wheel 20 between the hub 23 and gear ring 24, a plate 25 is located which is radially movable and provided with an upright carrier member 26. Said plate 25 has two tongues 27 guiding it about the hub 23, and a tooth 28 projecting outwardly through a groove 29 in a tooth space in the wheel 20. Said plate 25 is held in its outer position, FIG. 5, by means of a spring 30 except when the cogs adjacent said tooth 28 mesh with the pinion 19, in which case the tooth 28 is pressed inwards and the plate 25 is moved to its inner position (FIG. 6). Due to this possible movement of the plate 25 and its carrier member 26, said carrier member, when it is located in its outer position during the greater part of the revolution, can engage and take along a narrow follower pin 56 located on the mechanism thereabove, but releases said pin and disengages the connection therebetween when the tooth 28 is pressed inwards at the time the cocking operation is completed.

The cocking and releasing part (FIGS. 1–4) of said mechanism is located above the driving part and controlled thereby both by the carrier member 26 and by a lock carrier member 31 on the pinion 19. Nearest to the wheel 20 in the drive mechanism is located the cocking and releasing mechanism for the first curtain part 1 which drives a corresponding overlying mechanism for the second curtain part 2. Each such mechanism for the curtain parts 1, 2 comprises a ratchet wheel 32 and 33, respectively, mounted on the shaft 21 and meshing with the fixed gear rings 17 and 16, respectively. Said ratchet wheels 32, 33 are provided with stop pins 34 and 35, respectively, which in cocked state of the shutter (FIGS. 2 and 4) rest against the catches 38 and 39, respectively, which are movable about pins 36 and 37, respectively, and held in the positions shown by hairpin springs 40 and 41, respectively (FIGS. 1 and 2). The movability of the catches 38, 39 is restricted by pins 42 and 43, respectively, guided in bores (not shown) in locking arms 44 and 45, respectively, mounted on the locking pins 36 and 37, respectively. When the stop pins 34, 35 towards the end of the cocking operation of the shutter engage the catches 38 and 39, respectively, the catches are forced to spring outwardly. After the stop pins 34 and 35, respectively, having passed this position, the catches spring back and lock the shutter in cocked position.

During the first revolution of the pinion 19, the locking arms 44, 45 simultaneously are set on the armatures 46 and 47, respectively, of the release magnets 48 and 49, respectively, by the action of the lock carrier member 31 contracting a lever 50 on the locking arm 44 and turning said arm in clockwise direction. Both locking mechanisms are set simultaneously, due to an angularly bent tongue 51 provided on the locking arm 45 and resting against the locking arm 44. The locking mechanisms are retained in locked position by armature springs 52, 53 and retaining springs 54 and 55, respectively, until they are released at the time of exposure by their respective release magnets 48, 49. The gear ratio between the wheel 20 and pinion 19 having been chosen such, that the pinion 19 rotates more than one revolution, the lock carrier member 31 runs free of the lever 50 during the following revolution, as the locking mechanism already is set. The ratchet wheel 32 is driven by a lower follower pin 56, which gets into contact with the carrier member 26 and in its turn drives the ratchet wheel 33 through an upper follower pin 57, which gets into contact with follower pin 58 of the ratchet wheel 33.

The gap-forming part (FIGS. 3, 4, 7, 8) of said mechanism is mounted on and above the ratchet wheel 33 for the second curtain part 2 and comprises a device movably mounted on the ratchet wheel 33 and adapted to sense a cam means fixed on the camera body. Said sensing means comprises an angular lever 59, one end of which is supported on a journal 60 in the ratchet wheel 33 and the other end of which carries the downwardly directed follower pin 58 moving in a curved groove 61 in the ratchet wheel 33. At the knee of the angular lever 59 an upwardly directed pin 62 is located for sensing a cam plate 63, which with its central bore 64 encloses the hub 65 of the ratchet wheel 33 and is fixed on the camera body by a bracket 66 having pins 67 which are threaded into holes 68 in the cam plate 63. The curve on the cam plate 63 is of such a shape that the ascent is zero from the beginning of the shutter cocking operation until the overlapping curtain edges 12, 13 (FIG. 1) have moved past the film gate 3 and its left-hand side edge 5. Thereafter the curve ascends gradually up to maximum. During the final part of the cocking operation of the shutter when the sensing pin 62 passes along the ascending part of the curve on the cam plate 63, the gap formation between the curtain parts 1, 2 takes place, the follower pin 58 thereby moving from the outer position 69 in the groove 61 which it had occupied when the ascent of the cam curve is zero, to the opposite outer position 70 in said groove.

The ratchet wheel 33 thereby advances in relation to the ratchet wheel 34 a distance corresponding to the ascent of the cam plate 33. The length of the groove 61 is so adjusted that it allows for the angle addition on the left-hand outer curtain axle which is corresponded by the overlapping of the curtain parts 1, 2 plus the gap width s.

The curtain-type shutter is cocked in the manner as follows. In the starting position, with the shutter in released state, the overlapping parts of the first and second curtain parts 1 and 2, respectively, are on the outer right-hand curtain axle 6 (not shown). The locking mechanisms are in released position, as shown in FIGS. 1 and 3. Upon turning of the crank (not shown) on the camera, the drive shaft 18 with its pinion 19 rotates an integer number of revolutions, and the driven wheel 20 rotates one signel revolution. During its first revolution the pinion 19, acting through its lock carrier member 31 sets the locking mechanisms for the curtain parts 1, 2. When the wheel 20 starts to rotate, the carrier member 26 engages with the follower pin 56, thereby causing the ratchet wheel 32 to be rotated synchronously with the wheel 20. The follower pins 57, 58 also engage with one another, and accordingly the ratchet wheel 33 will also rotate synchronously with the wheel 20 as long as the ascent of the curve for the cam plate 63 is zero. During this phase the overlapping curtain parts 1, 2 are moved past the left-hand side edge 5 of the film gate 3 (FIGS. 1 and 3) and arrive at the outer left-hand curtain axle 7 when the curve starts to ascend. The pin 62 is now forced outwards by the camplate 63 and pulls, via the angular lever 59 and pin 60, the ratchet wheel 33 ahead of the ratchet wheel 32, because the follower pin 58 is freely movable between the outer positions 69 and 70, respectively, in the groove 61. Therefore, as long as the curve of the cam plate 63 ascends, the ratchet wheel 33 and thereby the curtain axle 7 which pulls the second curtain part 2, will run faster than the ratchet wheel 32 and thereby the curtain axle 9, which pulls the first curtain part 1. In this way, the overlapping between the curtain parts 1, 2 is reduced successively and transformed into a gap between the free curtain edges 12, 13, the width of which gap exceeds slightly the width of the preset gap s when the carrier member 26 in the final phase releases the pin 56.

After the driving of the ratchet wheels 32, 33 is stopped in this way, the spring-motors 14, 15 pull back on the mechanism via the curtain axles 6, 8, the curtain parts 1, 2 with traction means and the curtain axles 7, 9, whereby the ratchet wheels 32, 33 rotate through a short distance in counterclockwise direction in FIGS. 1–4 until their stop pins 34, 35 are stopped by the catches 38, 39, which had sprung out somewhat earlier when the stop pins 34, 35 were moving past said catches. During this short return movement of the mechanism in connection with the locking operation, the slightly too wide gap between the free edges 12, 13 narrows to the preset gap width s, the formation of which thereby is completed.

The curtain-type shutter with its preset curtain gap s is now cocked and ready for time of exposure. At the exposure the energization circuits for the release magnets 48, 49 are closed individually, and said magnets pull the armatures 46 and 47, respectively, which release the aforedescribed locking mechanisms for the curtain parts 1 and 2, respectively. The curtain parts, by action of the spring-motors 14 and 15, respectively, are pulled back to the starting position together with the remaining parts of the curtain mechanism.

Upon exposing with the fastest shutter speed of the curtain-type shutter, i.e., by using the preset gap width s, the locking mechanisms for the curtain parts 1 and 2, respectively, should be released simultaneously to maintain the gap width s unchanged when it moves past the film gate 3. Therefore, in order to maintain the precision achieved with the preset gap width s, the release magnet 49 for the second curtain part 2 is released somewhat prior to the release magnet 48 for the first curtain part 1. Since the tongue 51 on the locking arm 45 rests against the locking arm 44, the second curtain part 2 is prevented from being released until the first curtain part 1 has been released by the release magnet 48, whereafter the two curtain parts start simultaneously with the precision well maintained.

For other shutter speeds, i.e., slower ones, the preset gap width s has to be increased by a distance corresponding to the desired prolongation of the shutter speed over the fastest shutter speed. This is effected by delaying to a corresponding degree the release of the release magnet 49 of the second curtain part 2 by a known mechanical or electronic time delay device, whereby correction is made also with respect to the aforedescribed somewhat earlier release of the release magnet 49.

The embodiment descirbed above and shown in the drawings can be varied considerably within the scope of the invention so as to adapt it to the individual camera model. If it is deemed suitable, in view of the placement of the control means, or the space available in the camera, or for any other reason, the mechanism may, for example, be mirror inverted or turned through 90°, and the design of the details may be modified. The invention also may be modified such that it can be utilized with focal plane shutters of the type where, instead of the flexible curtain parts, two plane inflexible disks are used, in which case the curtain axles are replaced by a suitable mechanism controlled by an arrangement according to the basic idea of the invention.

What I claim is:

1. A focal plane shutter comprising first and second curtains mounted for bidirectional movement across a film gate between cocked and released shutter conditions respectively, said first and second curtains having free edges respectively which are disposed in overlapping relation to one another when said shutter is in its released condition, means for cocking said shutter comprising a first gear member selectively rotatable in a preselected direction to draw said first curtain from its released position toward its cocked position, a second gear member selectively rotatable to draw said second curtain from its released position toward its cocked position, drive means for rotating said first gear member in said preselected direction, coupling means between said first and second gear members responsive to rotation of said first gear member for effecting rotation of said second gear member thereby to cause both of said curtains to be drawn simultaneously from their released positions toward their cocked positions with the free edges of said curtains being maintained in said overlapping relation as said free edges move from the released positions of said curtains across said film gate toward the cocked positions of said curtains, said coupling means including a movable arm pivotally affixed to said second gear member, a cam disposed in fixed position adjacent said second gear member, and a cam follower mounted on said arm and engaging said cam, said cam and cam follower being operative to permit synchronous rotation of said first and second gear means until the overlapped free edges of said curtains have both moved completely across said film gate in a cocking direction whereafter said cam, operating through said cam follower, causes said arm to pivot relative to said second gear member so as to effect a differential movement between said first and second gear members to separate the free edges of said curtains from one another by an intervening gap of predetermined dimension corresponding to the fastest shutter speed as said cocking operation is completed.

2. The structure of claim 1 including first and second locking means disposed adjacent said first and second gear means respectively for locking said first and second curtains into their cocked positions, and means for releasing said first and second locking means to permit movement of said curtains across said film gate from their cocked positions to their released positions.

3. The structure of claim 2 wherein said releasing means is electromagnetically operable.

4. The structure of claim 1 wherein said arm is pivotally mounted at one of its ends on said second gear member, the other end of said arm including a projection which extends toward said first gear member for engagement with a pin affixed to said first gear member, said cam follower comprising a further pin affixed to said arm and bearing on the surface of said cam.

5. The structure of claim 4 wherein said arm is angularly shaped, said further pin being affixed to said arm at a position between the two ends of said arm.

6. The structure of claim 4 wherein said second gear member includes a slot, said projection extending from said arm on one side of said second gear member through said slot toward said first gear member.

7. The structure of claim 1 wherein said cam includes a first substantially circular portion concentric with the axis of rotation of said second gear member and operative to permit said synchronous rotation of said first and second gear members, and a second outwardly sloping portion merging smoothly into said first portion and operative to effect said differential movement between said first and second gear members.

8. The structure of claim 1 wherein said first and second gear members are coaxial with one another, said drive means comprising a third gear member coaxial with said first and second members, a follower member extending from said third gear member toward said first gear member, a pin extending from said first gear member toward said third gear member for engagement by said follower member, and a fourth gear member in mesh engagement with said third gear member for rotating said third gear member.

9. The structure of claim 8 including means responsive to occurrence of predetermined relative rotational positions of said third and fourth gear members for selectively moving said follower member from a first position in which it may engage said pin to a second position in which no such engagement can occur.

10. The structure of claim 9 including spring means for urging said follower member toward said first position.

11. The structure of claim 8 wherein the number of teeth on said third gear member comprises an integral multiple of the number of teeth on said fourth gear member.

12. The structure of claim 8 including locking means for selectively locking said first gear member into its cocked position, and a projection extending from said fourth gear member toward said locking means for controlling the operation of said locking means.

13. The structure of claim 12 including further locking means for selectively locking said second gear member into its cocked position, and means extending from one to the other of said locking means for coordinating the operations of said two locking means.

* * * * *